(12) United States Patent
Umeyama et al.

(10) Patent No.: US 10,511,024 B2
(45) Date of Patent: Dec. 17, 2019

(54) ELECTRODE FOR NONAQUEOUS ELECTROLYTE SECONDARY BATTERY AND METHOD OF MANUFACTURING THE SAME

(71) Applicant: TOYOTA JIDOSHA KABUSHIKI KAISHA, Toyota-shi, Aichi-ken (JP)

(72) Inventors: Hiroya Umeyama, Okazaki (JP); Tatsuya Hashimoto, Osaka (JP); Naoyuki Wada, Hirakata (JP); Keiichi Takahashi, Nishinomiya (JP); Koichi Toriyama, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 186 days.

(21) Appl. No.: 14/990,251

(22) Filed: Jan. 7, 2016

(65) Prior Publication Data

US 2016/0204438 A1 Jul. 14, 2016

(30) Foreign Application Priority Data

Jan. 9, 2015 (JP) ................................. 2015-003371

(51) Int. Cl.
*H01M 4/62* (2006.01)
*H01M 4/133* (2010.01)
(Continued)

(52) U.S. Cl.
CPC ........... *H01M 4/62* (2013.01); *H01M 4/0404* (2013.01); *H01M 4/13* (2013.01); *H01M 4/131* (2013.01);
(Continued)

(58) Field of Classification Search
CPC ...... H01M 4/62; H01M 4/0404; H01M 4/131; H01M 4/133; H01M 4/1393; H01M 4/13;
(Continued)

(56) References Cited

U.S. PATENT DOCUMENTS 6,255,020 B1 * 7/2001 Yamashita ............ H01M 4/525
429/231.95
6,667,099 B1 * 12/2003 Greiner .................. B01D 69/02
264/29.1
(Continued)

FOREIGN PATENT DOCUMENTS

CN 103066280 A 4/2013
DE 11 2014 000 537 T5 11/2015
(Continued)

OTHER PUBLICATIONS

Aubuchon (Dissertation 2006 UC San Diego, p. 10; "Control of Carbon Nanotube Growth Directions and Morphology by Direct Current plasma enhanced Chemical Vapor Deposition").*
(Continued)

*Primary Examiner* — Jonathan G Leong
*Assistant Examiner* — Aaron Greso
(74) *Attorney, Agent, or Firm* — Sughrue Mion, PLLC

(57) ABSTRACT

An electrode for a nonaqueous electrolyte secondary battery includes an electrode mixture layer. The electrode mixture layer contains a hollow active material particle and a needle-shaped filler having a through-hole that extends through the needle-shaped filler in a longitudinal direction. The needle-shaped filler is arranged on surfaces of the hollow active material particle.

16 Claims, 7 Drawing Sheets

(51) Int. Cl.
| | |
|---|---|
| *H01M 4/13* | (2010.01) |
| *H01M 4/139* | (2010.01) |
| *H01M 4/131* | (2010.01) |
| *H01M 4/1391* | (2010.01) |
| *H01M 4/1393* | (2010.01) |
| *H01M 4/04* | (2006.01) |
| *H01M 4/505* | (2010.01) |
| *H01M 4/525* | (2010.01) |
| *H01M 10/052* | (2010.01) |
| *H01M 4/02* | (2006.01) |

(52) U.S. Cl.
CPC ........... *H01M 4/133* (2013.01); *H01M 4/139* (2013.01); *H01M 4/1391* (2013.01); *H01M 4/1393* (2013.01); *H01M 4/505* (2013.01); *H01M 4/525* (2013.01); *H01M 10/052* (2013.01); *H01M 2004/027* (2013.01); *H01M 2004/028* (2013.01)

(58) Field of Classification Search
CPC .... H01M 4/1391; H01M 4/139; H01M 4/505; H01M 4/525; H01M 2004/027; H01M 2004/028; H01M 10/052
See application file for complete search history.

(56) References Cited

U.S. PATENT DOCUMENTS

| | | | | |
|---|---|---|---|---|
| 2009/0142665 A1* | 6/2009 | Sheem | ................ | H01M 4/366 429/213 |
| 2009/0317710 A1* | 12/2009 | Douglas | .............. | H01M 2/0275 429/163 |
| 2010/0004372 A1* | 1/2010 | Goto | ........................ | B01J 23/28 524/430 |
| 2010/0261061 A1 | 10/2010 | Yuasa et al. | | |
| 2010/0266896 A1* | 10/2010 | Stromme | ................ | C08J 7/047 429/209 |
| 2012/0107683 A1* | 5/2012 | Kim | .................... | H01M 4/0404 429/211 |
| 2012/0282525 A1* | 11/2012 | Nagai | ................... | H01M 4/505 429/223 |
| 2013/0236783 A1* | 9/2013 | Kose | ........................ | H01M 4/13 429/211 |
| 2013/0280610 A1* | 10/2013 | Hwang | ................ | H01M 4/131 429/221 |
| 2013/0302687 A1 | 11/2013 | Nagai et al. | | |
| 2014/0356726 A1 | 12/2014 | Han et al. | | |
| 2016/0006030 A1 | 1/2016 | Saka et al. | | |

FOREIGN PATENT DOCUMENTS

| | | |
|---|---|---|
| JP | 2007048692 A | 2/2007 |
| JP | 2007059142 A | 3/2007 |
| JP | 2011-508365 A | 3/2011 |
| JP | 2011-119092 A | 6/2011 |
| JP | 2012174369 A | 9/2012 |
| KR | 10-2012-0099108 A | 9/2012 |
| WO | 2009155267 A1 | 12/2009 |

OTHER PUBLICATIONS

Lock et al. Physical Chemistry C Letters vol. 111 pp. 13655-13658 2007.*
Lou et al. Advanced Materials, vol. 20, pp. 258-262, 2008.*
American Elements (About Cobalt Oxide Pieces section) {https://www.americanelements.com/cobalt-ii-iii-oxide-1308-06-1} WAYBACK Machine posting evidence Sep. 12, 2015 Printed Jul. 31, 2018.*
Astbury et al. Proceedings of the Royal Society of London. Series B, Biological Sciences, vol. 129, No. 854 (Jun. 20, 1940), pp. 54-76.*

* cited by examiner

ELECTRODE FOR NONAQUEOUS ELECTROLYTE SECONDARY BATTERY AND METHOD OF MANUFACTURING THE SAME

INCORPORATION BY REFERENCE

The disclosure of Japanese Patent Application No. 2015-003371 filed on Jan. 9, 2015 including the specification, drawings and abstract is incorporated herein by reference in its entirety.

BACKGROUND OF THE INVENTION

1. Field of the Invention

The present invention relates to an electrode for a nonaqueous electrolyte secondary battery and a method of manufacturing the same.

2. Description of Related Art

Japanese Patent Application Publication No. 2011-119092 (JP 2011-119092 A) discloses an electrode which contains active material particles having a hollow structure (hereinafter, referred to as "hollow active material particle").

The hollow active material particles can hold an electrolytic solution in hollow portions thereof. As a result, in an electrode mixture layer containing the hollow active material particles, a reduction in the non-uniformity of the electrolytic solution distribution can be expected. However, in an electrode including the hollow active material particles, there is room for improvement in terms of the following points.

In general, an electrode for a nonaqueous electrolyte secondary battery is manufactured by applying a paste containing active material particles to a current collector foil. This paste is a dispersion in which active material particles, a binder, and the like are dispersed in a solvent. In the hollow active material particles, a solvent for a paste may penetrate into hollow portions thereof. For example, when a solvent having a high boiling point such as N-methyl-2-pyrrolidone (NMP) is used, even after a drying step of drying a paste, the solvent penetrating into the hollow portions may remain in the hollow portions without being completely volatilized. When a solvent remains in the hollow portions, the hollow portions cannot hold an electrolytic solution. Accordingly, the effects expected from the hollow active material particles may be reduced.

In order to promote the volatilization of a solvent, various countermeasures such as an increase in the hot air drying temperature or hot air flow rate of the drying step may be considered. However, in this case, large heat convection occurs during the drying of a solvent, which promotes the migration of a binder to the surface of a coating film. In an electrode mixture layer formed using the above-described method, the binder segregates in the surface thereof, which decreases reactivity on the surface of an electrode. Further, the amount of the binder is insufficient at an interface between the electrode mixture layer and a current collector foil, which decreases the peeling strength of the electrode mixture layer.

SUMMARY OF THE INVENTION

The present invention provides an electrode for a nonaqueous electrolyte secondary battery and a method of manufacturing the same.

According to a first aspect of the invention, an electrode for a nonaqueous electrolyte secondary battery includes an electrode mixture layer. The electrode mixture layer contains a hollow active material particle and a needle-shaped filler having a through-hole that extends through the needle-shaped filler in a longitudinal direction. The needle-shaped filler is arranged on surfaces of the hollow active material particle.

The needle-shaped filler having a through-hole can function as a capillary. In the above-described aspect, the needle-shaped filler is arranged on a surface of the hollow active material particle. Due to a capillary phenomenon, the needle-shaped filler absorbs the solvent from the inside and periphery of the hollow active material particle. As a result, the volatilization of the solvent penetrating into the hollow active material particle is promoted. Accordingly, the remaining of the solvent can be suppressed.

By the amount of the remaining solvent being reduced, a space for holding the electrolytic solution is formed in the hollow active material particle. When being impregnated with the electrolytic solution, the needle-shaped filler as a capillary may function a path through that the electrolytic solution is introduced into the hollow active material particle. By the hollow active material particle holding the electrolytic solution, the electrolytic solution distribution in the electrode is likely to be maintained. As a result, the non-uniformity in the electrolytic solution distribution is reduced in the electrode. When the non-uniformity in the electrolytic solution distribution is reduced, for example, improvement of cycle characteristics can be expected.

In the electrode for a nonaqueous electrolyte secondary battery, a content of the needle-shaped filler may be 0.5 parts by mass to 2.0 parts by mass with respect to 100 parts by mass of the hollow active material particle. By adjusting the mixing amount of the needle-shaped filler to be within the above-described range, the non-uniformity of the electrolytic solution distribution can be easily reduced.

A diameter of the needle-shaped filler may be 0.1 μm to 3.0 μm. By adjusting the diameter of the needle-shaped filler to be within the above-described range, the promotion of the capillary phenomenon can be expected.

According to a second aspect of the invention, there is provided a method of manufacturing an electrode for a nonaqueous electrolyte secondary battery, the method including: obtaining a first granulated body by granulating hollow active material particle and a binder; obtaining a second granulated body by granulating the first granulated body and a needle-shaped filler having a through-hole that extends through the needle-shaped filler in a longitudinal direction; forming an electrode mixture layer by forming the second granulated body into a sheet shape; and arranging the electrode mixture layer on a current collector foil.

When an electrode mixture layer is formed of a paste as in the case of a manufacturing method of the related art, it is necessary that a large amount of solvent is used to prepare the paste. Therefore, the needle-shaped filler may aggregate and may not be arranged on the surface of the hollow active material particle. Therefore, the following is presumed: it is difficult to manufacture the electrode for a nonaqueous electrolyte secondary battery according to the first aspect of the invention.

On the other hand, in the manufacturing method according to the second aspect of the invention, the electrode mixture layer is formed of a granulated body. The granulated body is an aggregate of granulated particles. The amount of a solvent required to form the granulated body is smaller than that required to form a paste. The electrode mixture layer can be formed by pressing the granulated body into a sheet shape. By adopting this method, the electrode mixture layer can be realized in which the needle-shaped filler is arranged on the surface of the hollow active material particles Further, in the manufacturing method according to the second aspect of the invention, the granulation is performed through two steps. Therefore, the needle-shaped filler can be arranged on the surface of the granulated particle. As a result, according to the second aspect of the invention, the volatilization of the solvent can be promoted. On the other hand, when granulation is performed through one step, the effect of promoting the volatilization of the solvent may be reduced. That is, when the hollow active material particle, the binder, and the needle-shaped filler are mixed with each other at the same time to form a granulated body, a portion of the needle-shaped filler is introduced into the granulated particle. It is presumed that, when the needle-shaped filler is introduced into the granulated particle, the function of promoting the volatilization of the solvent deteriorates.

According to the first aspect and the second aspect of the invention, the non-uniformity of the electrolytic solution distribution can be reduced in the electrode mixture layer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention (hereinafter, referred to as "the embodiment") will be described in detail. However, the embodiment is not limited to the following description. Hereinafter, an application example of the embodiment to a positive electrode will be described, but the embodiment is also applicable to a negative electrode. That is, in the embodiment, it is only necessary that at least one of a positive electrode and a negative electrode includes: hollow active material particles; and a needle-shaped filler that is arranged on surfaces of the hollow active material particles. When the embodiment is applied to an electrode which is manufactured using a solvent having a high boiling point (for example, NMP), the effect thereof is high.

Figure 1:
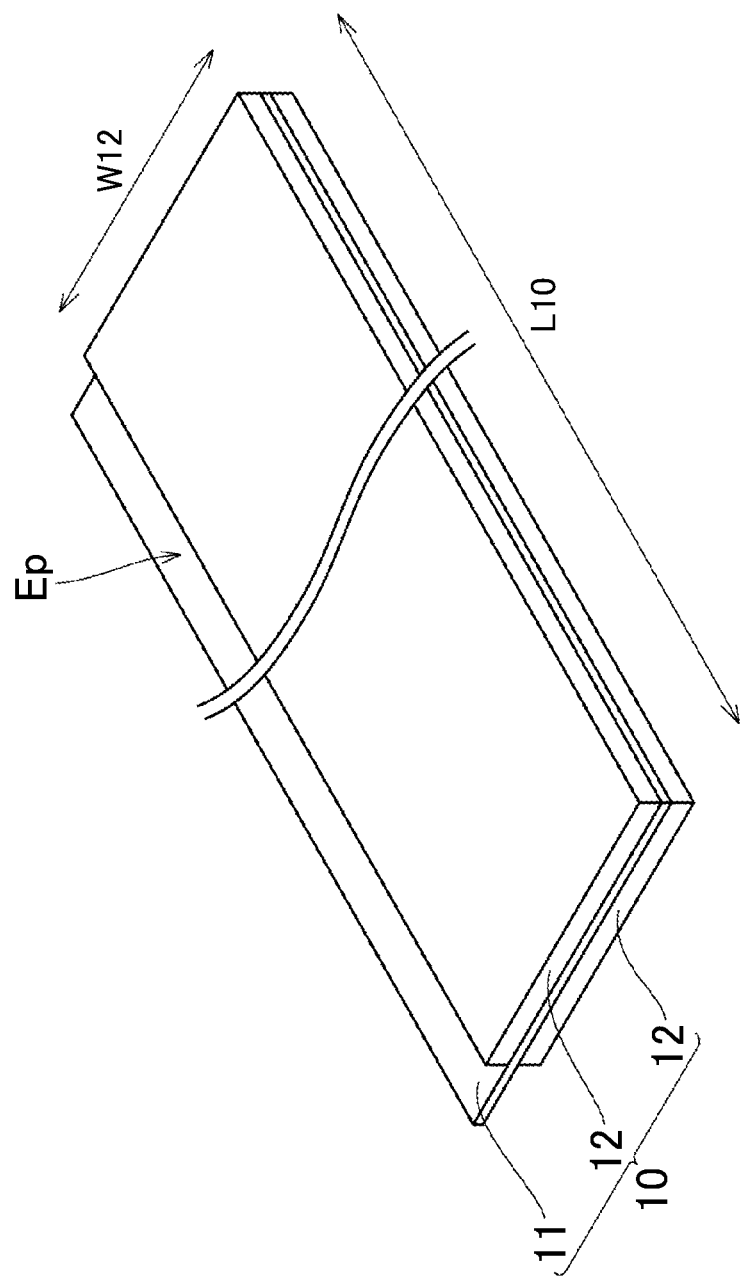
FIG. 1 is a schematic diagram showing a configuration example of a positive electrode according to an embodiment of the invention.

FIG. 1 is a schematic diagram showing a configuration example of a positive electrode according to the embodiment. As shown in FIG. 1, a positive electrode 10 includes: a positive electrode current collector foil 11; and a positive electrode mixture layer 12 that is arranged on both main surfaces of the positive electrode current collector foil 11. Here, "positive electrode" may be considered as "electrode", and "positive electrode mixture layer" may be considered as "electrode mixture layer". The positive electrode current collector foil 11 is, for example, an aluminum (Al) foil. An exposure portion Ep where the positive electrode current collector foil 11 is exposed is provided for connection to an external terminal.

The positive electrode mixture layer is formed of a granulated body. That is, the positive electrode mixture layer is formed of plural granulated particles. The granulated particles contain plural positive electrode active material particles and the like. A mixture layer formed of a granulated body can be distinguished from a mixture layer formed of a paste. A difference between the mixture layers can be verified for example, by observing sections of the mixture layers with a SEM or the like. In the section of the mixture layer formed of a granulated body, a structure can be verified in which plural granulated particles having an external shape such as a substantially spherical shape, an egg shape, or a cylindrical shape are pressed against each other and are arranged in a stone wall shape. In this section, a boundary surface between adjacent granulated particles can be verified. On the other hand, in the mixture layer formed of a paste, active material particles are substantially uniformly dispersed. In the mixture layer formed of a paste, a boundary surface between granulated particles cannot be verified.

The granulated particles contain positive electrode active material particles, a conductive material, a binder, and a needle-shaped filler. In the embodiment, some or all of the positive electrode active material particles are hollow active material particles. The proportion of the hollow active material particles in the positive electrode active material particles may be 1% by number or higher, 10% by number or higher, or 50% by number or higher. The proportion of the hollow active material particles can be measured by observing a section of the positive electrode mixture layer with a SEM at a magnification of about 100 times to 1000 times. That is, the number of hollow active material particles in the observation visual field is measured and is divided by the total number of the positive electrode active material particles contained in the same visual field, thereby calculating the proportion of the hollow active material particles. As the proportion of the hollow active material particles increases, a reduction in the non-uniformity of the electrolytic solution distribution can be expected in the positive electrode mixture layer.

In the granulated particles, the needle-shaped filler is arranged on surfaces of the hollow active material particles. In other words, in the positive electrode mixture layer, the needle-shaped filler is present on the above-described boundary surface between the granulated particles. The needle-shaped filler is a capillary having a through-hole. As a result, the solvent is likely to be volatilized from the hollow active material particles. Simultaneously, the electrolytic solution is also likely to be introduced into the hollow active material particles. In the granulated particles, the needle-shaped filler may be present on the surfaces or in the inside of the granulated particles. As the proportion of the needle-shaped filler arranged on the surfaces of the granulated particles increases, the volatilization of the solvent is more likely to be promoted. Accordingly, in the embodiment, the higher the proportion of the needle-shaped filler arranged on the surfaces of the granulated particles, the better. For example, through two steps of granulation described below, the proportion of the needle-shaped filler present on the surfaces of the granulated particles can be increased. However, as long as the needle-shaped filler is arranged on the surfaces of the hollow active material particles, the volatilization of the solvent can be promoted. The needle-shaped filler being arranged on the surfaces of the granulated particles can be verified by observing a section of the positive electrode mixture layer with a SEM or the like.

In the embodiment, as long as some or all of the positive electrode active material particles are the hollow active material particles, the chemical composition of the positive electrode active material particles is not particularly limited. Specifically, for example, the positive electrode active material particles may have a chemical composition such as $LiCoO_2$, $LiNiO_2$, $LiNi_aCo_bO_2$ (wherein, $a+b=1$, $0<a<1$, and $0<b<1$), $LiMnO_2$, $LiMn_2O_4$, $LiNi_aCo_bMn_cO_2$ (wherein, $a+b+c=1$, $0<a<1$, $0<b<1$, and $0<c<1$), or $LiFePO_4$.

Each of the positive electrode active material particles is a secondary particle which is an aggregate of primary particles. The average particle size of the secondary particles may be, for example, about 3 μm to 25 μm. Here, "average particle size" refers to a particle size (so-called "D50") corresponding to a cumulative value of 50% in a particle size distribution measured using a laser diffraction scattering method. The particle size of the primary particles may be, for example, 0.1 μm to 2 μm.

Figure 2:
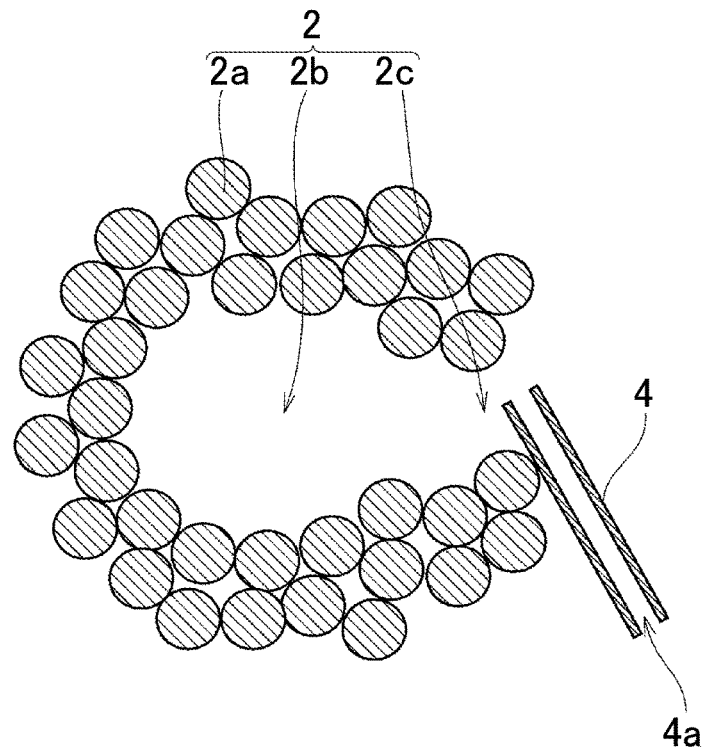
FIG. 2 is a schematic diagram showing hollow active material particles and a needle-shaped filler according to the embodiment of the invention.

FIG. 2 is a schematic diagram showing an example of the hollow active material particles and the needle-shaped filler. The shape of the particles can also be verified by observing a section of the positive electrode mixture layer with a SEM or the like. As shown in FIG. 2, a hollow active material particle 2 is a secondary particle including: outer shells that are formed of primary particles 2a; a hollow portion 2b that is surrounded by the outer shells; and a through-hole 2c that is formed through the outer shells. Plural through-holes 2c may be formed.

The solvent penetrates into the hollow portion 2b through the through-hole 2c. In the embodiment, by arranging a needle-shaped filler 4 on a surface of the hollow active material particle 2, liquid absorption caused by a capillary phenomenon promotes the discharge of the solvent from the hollow portion 2b. As a result, the solvent is likely to be volatilized, and the remaining of the solvent is suppressed.

By reducing the solvent of the hollow portion 2b, the electrolytic solution can be introduced into the hollow portion 2b when impregnated into the positive electrode mixture layer. The electrolytic solution may be introduced into the hollow portion 2b through the needle-shaped filler 4. By holding the electrolytic solution in the hollow portion 2b, the non-uniformity in the distribution of the electrolytic solution can be reduced in the positive electrode mixture layer.

The needle-shaped filler 4 has a through-hole 4a which that extends through the needle-shaped filler in a longitudinal direction. By arranging the needle-shaped filler 4 on the surface of the hollow active material particle 2, the volatilization of the solvent from the hollow portion 2b can be promoted. It is preferable that the needle-shaped filler is non-conductive. When the needle-shaped filler is non-conductive, improvement of high-temperature preservation characteristics can be expected. The needle-shaped filler may be, for example, a hollow fiber such as cellulose or polyacrylonitrile. The hollow fiber may be produced by microfibrillating a highly-purified cellulose fiber as a raw material. This hollow fiber is non-conductive. Examples of a conductive needle-shaped filler include carbon nanofiber.

The diameter of the needle-shaped filler may be 0.1 μm to 10.0 μm. The upper limit of the diameter of the needle-shaped filler may be 3.0 μm, 1.0 μm, or 0.5 μm. When the diameter is within the above-described range, the promotion of a capillary phenomenon can be expected. When the needle-shaped filler is a hollow fiber, the fiber diameter can be considered as the diameter of the fiber diameter. The fiber length of the hollow fiber may be, for example, about 2 μm to 20 μm.

The mixing amount of the needle-shaped filler may be 0.1 parts by mass to 5.0 parts by mass with respect to 100 parts by mass of the hollow active material particles. The lower limit of the mixing amount of the needle-shaped filler may be 0.5 parts by mass, and the upper limit thereof may be 2.0 parts by mass. When the mixing amount is within the above-described range, a reduction in the non-uniformity of the electrolytic solution can be expected.

The binder may be, for example, polyvinylidene fluoride (PVDF) or polytetrafluoroethylene (PTFE). The mixing amount of the binder may be, for example, about 1 part by mass to 5 parts by mass with respect to 100 parts by mass of the positive electrode active material particles.

For example, the conductive material may be amorphous carbon such as acetylene black (AB) or graphite. The mixing amount of the conductive material may be, for example, about 1 part by mass to 10 parts by mass with respect to 100 parts by mass of the positive electrode active material particles.

Figure 3:
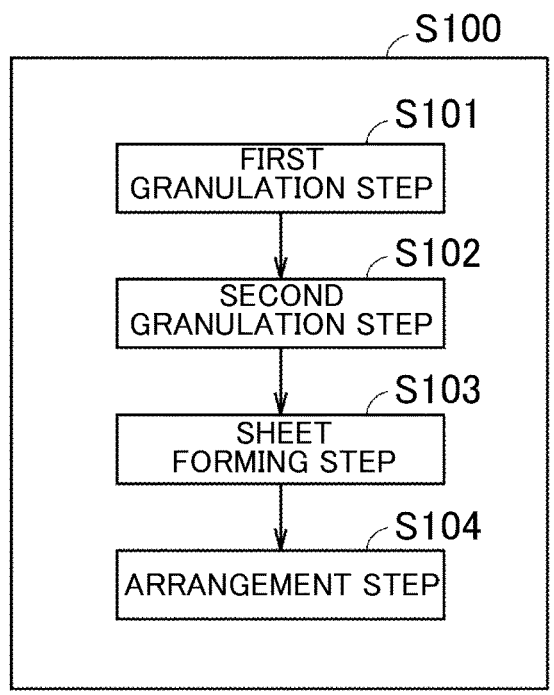
FIG. 3 is a flowchart showing the summary of a method of manufacturing the electrode for a nonaqueous electrolyte secondary battery according to the embodiment of the invention.

The positive electrode can be manufactured using the following manufacturing method. FIG. 3 is a flowchart showing the summary of a method of manufacturing the electrode for a nonaqueous electrolyte secondary battery according to the embodiment. As shown in FIG. 3, the manufacturing method includes a first granulation step (S101), a second granulation step (S102), a sheet forming step (S103), and an arrangement step (S104). In this manufacturing method, the positive electrode mixture layer is formed of a granulated body. As a result, the needle-shaped filler can be arranged at an appropriate position of the hollow active material particles. Further, while maintaining this state, the electrode mixture layer can be formed. Hereinafter, each step will be described.

In the first granulation step, a first granulated body is obtained by granulating hollow active material particles, a binder, and a conductive material. The first granulation step and the second granulation step are performed in a granulator. The granulator is not particularly limited. For example, "HIGH SPEED GRAL" manufactured by EARTHTECHNICA Co., Ltd. is preferably used.

First, a predetermined amount of powder of the positive electrode active material particles, a predetermined amount of powder of the binder, and a predetermined amount of powder of the conductive material are measured. In this step, the positive electrode active material particles, the binder, and the conductive material are added to the granulator, and are mixed with each other using a dry method. Next, a solvent is added to the mixture. At this time, at least a portion of the powder of the positive electrode active material particles contain the hollow active material particles. As the solvent, for example, NMP can be used. In this step, the solid content concentration of the mixture may be, for example, 80 mass % to 85 mass %. Various conditions including the rotating speed of an stirring blade and the mixing time may be appropriately adjusted based on the powder properties of the mixture, the batch amount, and the like.

The conductive material may be dividedly added in the first granulation step and the second granulation step. With the above-described configuration, the conductive material is arranged on the surfaces or in the inside of the granulated particles, which may improve the conductivity of the positive electrode mixture layer. In this step, the total amount of the hollow active material particles and the binder may be added.

In the second granulation step, a second granulated body is obtained by granulating the first granulated body and a needle-shaped filler having a through-hole which extends through the needle-shaped filler in a longitudinal direction. For example, a predetermined amount of the needle-shaped filler may be put into the granulator so as to be mixed with the first granulated body. As a result, the needle-shaped filler is attached to a surface of the first granulated body. That is, the needle-shaped filler is arranged on the surfaces of the hollow active material particles. At this time, as described above, the remaining conductive material may be added. Next, for example, the shape of the granulated particles may be adjusted by performing, for example, extrusion granulation. The granulated particles may have a substantially spherical shape, an egg shape, or a cylindrical shape. The solid content concentration of the second granulated body may be, for example, 70 mass % to 80 mass %.

Figure 4:
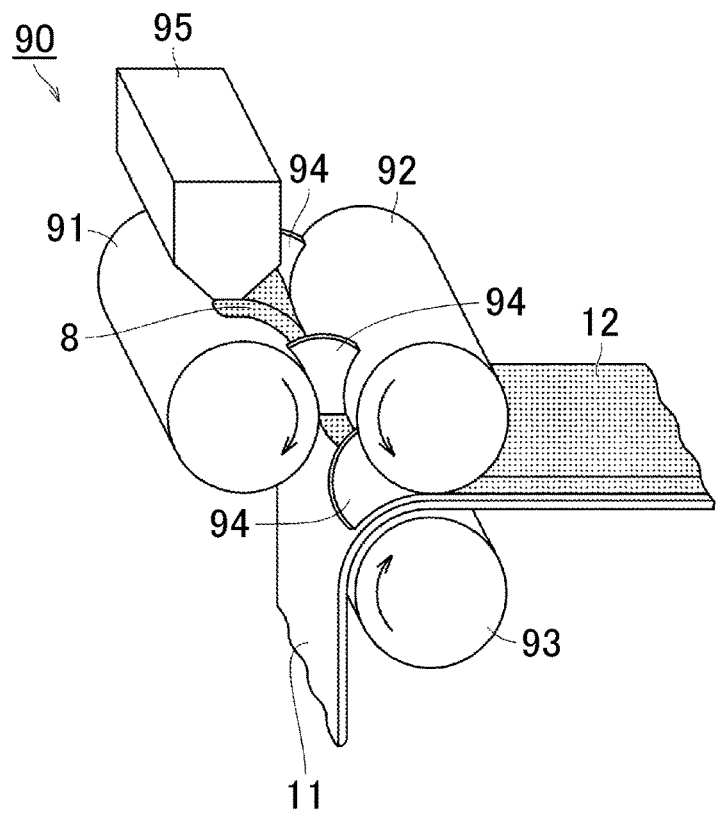
FIG. 4 is a schematic diagram showing a sheet forming step and an arrangement step according to the embodiment of the invention.

In the sheet forming step, a positive electrode mixture layer is formed by pressing the second granulated body into a sheet shape. FIG. 4 is a schematic diagram showing an example of the sheet forming step and the arrangement step. These steps can be performed using an electrode manufacturing apparatus 90 shown in FIG. 4.

A second granulated body 8 is put into a feeder 95 of the electrode manufacturing apparatus 90. The second granulated body is supplied from the feeder 95 onto an A roller 91 or a B roller 92. In FIG. 4, arrows indicate rotating directions of the respective roller members. The second granulated body 8 is transported along the A roller 91 or the B roller 92 in the arrow direction and reaches a gap between the A roller 91 and the B roller 92. In the gap, pressure is applied from the A roller 91 and the B roller 92 to the second granulated body 8 such that the second granulated body 8 is formed into the sheet-shaped positive electrode mixture layer 12. The width of the positive electrode mixture layer 12 is adjusted by partition members 94. The coating mass (mass per unit area) and thickness of the positive electrode mixture layer 12 are adjusted by the gap between the A roller 91 and the B roller 92.

In the arrangement step, the positive electrode mixture layer is arranged on a positive electrode current collector foil. As shown in FIG. 4, the positive electrode mixture layer 12, which has been formed in the sheet forming step, is transported along the B roller 92 in the arrow direction. The positive electrode current collector foil 11 is transported along a C roller 93 in the arrow direction. In the gap between the B roller 92 and the C roller 93, pressure is applied from the B roller 92 and the C roller 93 to the positive electrode mixture layer 12 and the positive electrode current collector foil 11 such that the positive electrode mixture layer 12 is pressed from the B roller 92 to one main surface of the positive electrode current collector foil 11. In this way, the positive electrode mixture layer 12 is arranged at a predetermined position on the positive electrode current collector foil 11.

After being pressed, the positive electrode mixture layer may be dried using a drying furnace. Further, the positive electrode mixture layer may be rolled to adjust the thickness. Likewise, the positive electrode mixture layer 12 can be arranged on the other main surface of the positive electrode current collector foil 11. Next, by processing the whole body of the laminate to obtain a predetermined dimension, the positive electrode 10 shown in FIG. 1 is completed.

Figure 5:
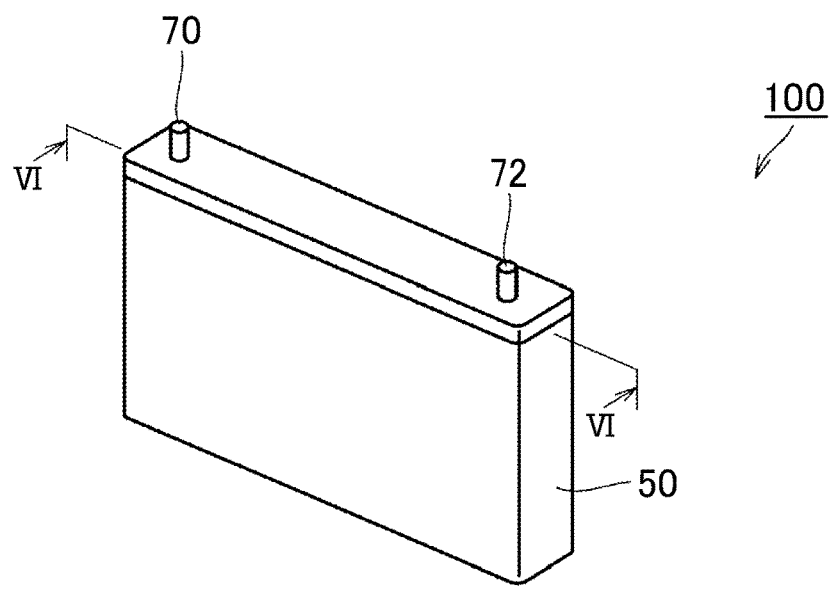
FIG. 5 is a schematic diagram showing a configuration example of a nonaqueous electrolyte secondary battery according to the embodiment of the invention.

FIG. 5 is a schematic diagram showing a configuration example of a nonaqueous electrolyte secondary battery according to the embodiment. A battery 100 includes the above-described electrode for a nonaqueous electrolyte secondary battery (positive electrode). In the positive electrode mixture layer according to the embodiment, the amount of the remaining solvent is small, and the non-uniformity of the electrolytic solution distribution is small. Therefore, in the battery 100, for example, superior cycle characteristics can be expected. Since the positive electrode has been described above, the configurations of components other than the positive electrode will be described.

As shown in FIG. 5, the battery 100 includes a case 50. The case 50 is formed of, for example, an Al alloy. For example, the case 50 includes a lid and a body. A positive electrode terminal 70 and a negative electrode terminal 72 are provided on the case 50. In the case 50, for example, a liquid injection hole, a safety valve, and a current interrupt device (all of which are not shown) may be provided.

Figure 6:
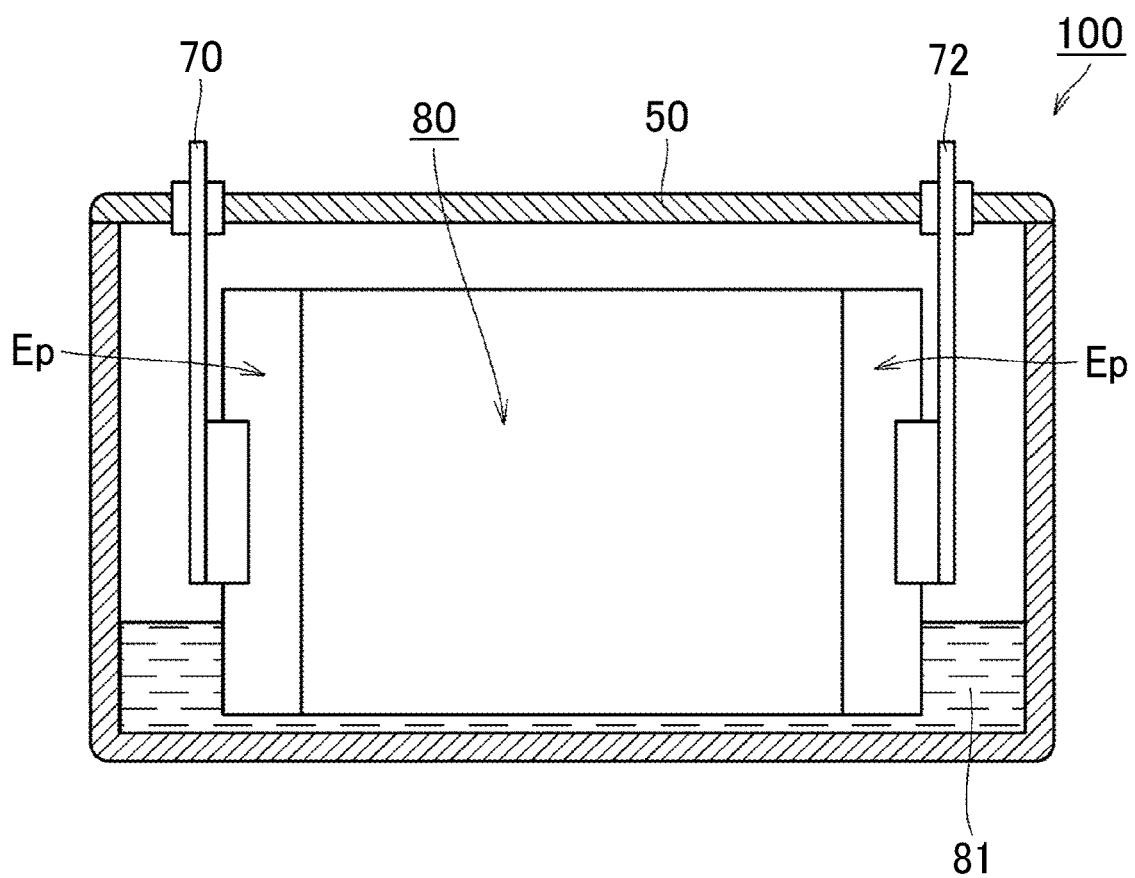
FIG. 6 is a schematic sectional view taken along line VI-VI of FIG. 5.
Figure 7:
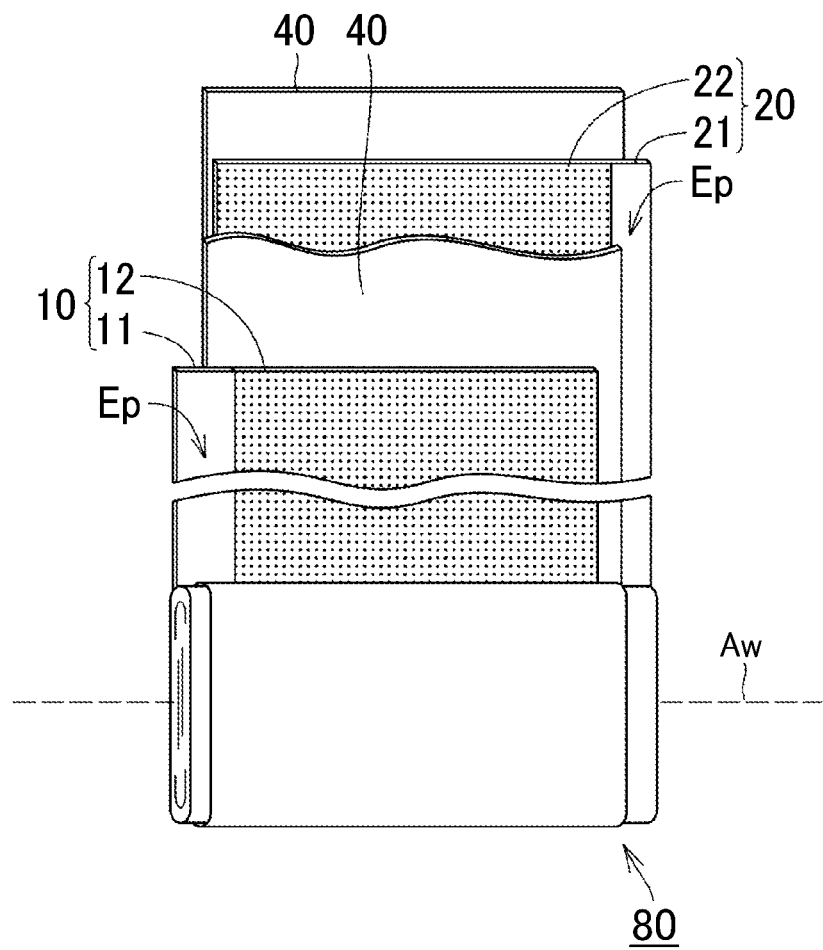
FIG. 7 is a schematic diagram showing a configuration example of an electrode group according to the embodiment of the invention.

FIG. 6 is a schematic sectional view taken along line VI-VI of FIG. 5. As shown in FIG. 6, an electrode group 80 and an electrolytic solution 81 are accommodated in the case 50. FIG. 7 is a schematic diagram showing a configuration example of the electrode group. As shown in FIG. 7, the electrode group 80 is obtained by laminating the positive electrode 10 and a negative electrode 20 with separators 40 interposed therebetween to obtain a laminate and winding the laminate. In FIG. 7, a dotted line indicates a winding axis Aw during winding. Exposure portions Ep of the positive electrode 10 and the negative electrode 20 are arranged in end portions in a direction moving along the winding axis Aw. As shown in FIG. 6, the electrode group 80 is electrically connected to the positive electrode terminal 70 and the negative electrode terminal 72 through the exposure portions Ep.

Figure 8:
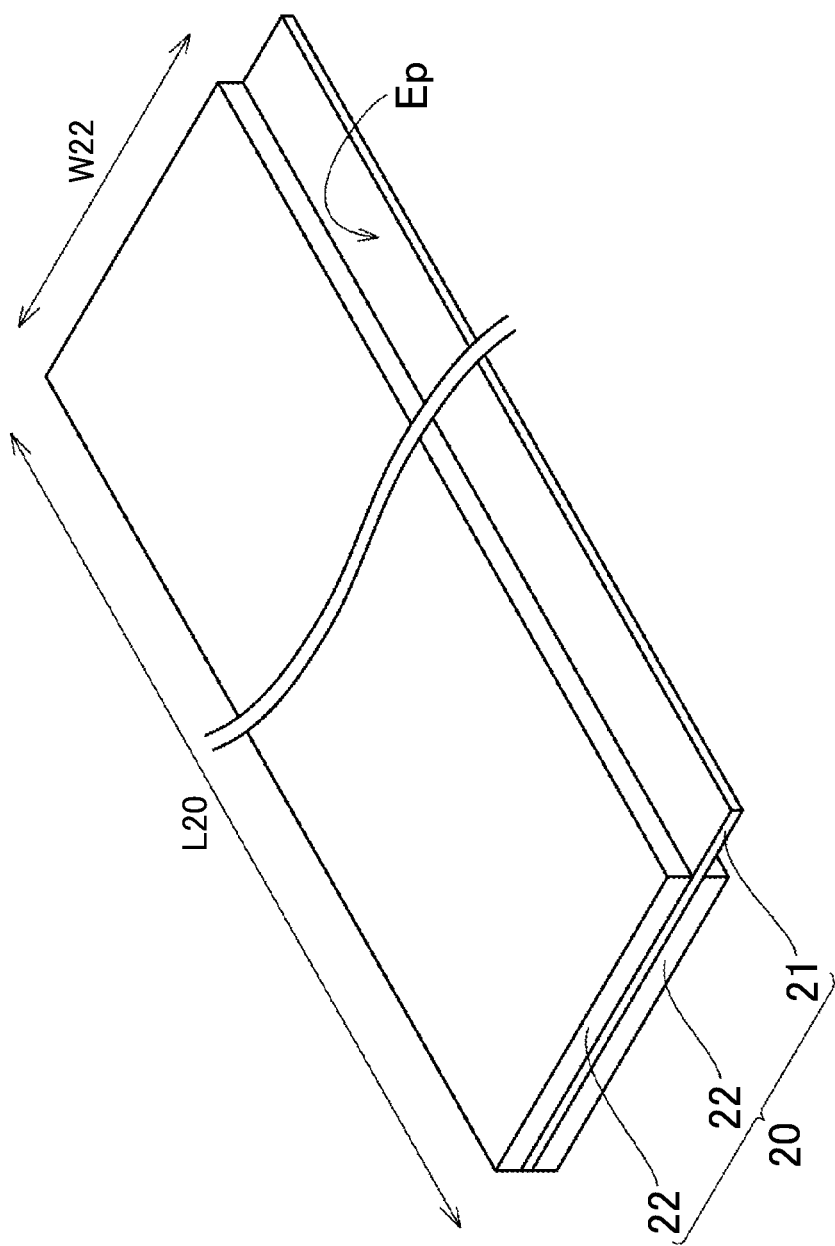
FIG. 8 is a schematic diagram showing a configuration example of a negative electrode according to the embodiment of the invention.

FIG. 8 is a schematic diagram showing a configuration example of the negative electrode according to the embodiment. As shown in FIG. 8, the negative electrode 20 includes: a negative electrode current collector foil 21; and a negative electrode mixture layer 22 that is arranged on both main surfaces of the negative electrode current collector foil 21. The negative electrode current collector foil 21 is, for example, a copper (Cu) foil. The exposure portion Ep where the negative electrode current collector foil 21 is exposed is provided for connection to an external terminal.

The negative electrode mixture layer 22 contains negative electrode active material particles, a thickener, and a binder. The negative electrode active material particles are not particularly limited. For example, the negative electrode active material particles may be formed of a carbon negative electrode active material such as graphite or coke, or an alloy negative electrode active material of silicon (Si), tin (Sn), and the like. As the thickener, for example, carboxymethyl cellulose (CMC) may be used. The mixing amount of the thickener may be, for example, about 0.5 parts by mass to 2 parts by mass with respect to 100 parts by mass of the negative electrode active material particles. As the binder, for example, styrene-butadiene rubber (SRB) can be used. The mixing amount of the binder may be, for example, about 0.5 parts by mass to 2 parts by mass with respect to 100 parts by mass of the negative electrode active material particles.

The separator 40 prevents electrical contact between the positive electrode 10 and the negative electrode 20 while allowing penetration of lithium (Li) ions. The separator may be a porous layer formed of polyethylene (PE), polypropylene (PP), or the like.

The separator may have a single-layer structure or a multi-layer structure. In the separator, a heat resistance layer may be formed on a surface of a single-layer or multi-layer porous layer which is a substrate. For example, the heat resistance layer may contain: an inorganic filler such as alumina particles; and a binder. The thickness of the separator may be, for example, 5 µm to 40 µm. The pore size and porosity of the separator may be appropriately adjusted such that the air permeability is a desired value.

The electrolytic solution is an electrolytic solution in which a supporting electrolyte is dissolved in a nonaqueous solvent. Examples of the nonaqueous solvent which can be used include cyclic carbonates such as ethylene carbonate (EC), propylene carbonate (PC), butylene carbonate (BC), and γ-butyrolactone (γBL); and chain carbonates such as dimethyl carbonate (DMC), ethyl methyl carbonate (EMC), and diethyl carbonate (DEC). Among these nonaqueous solvents, a combination of two or more kinds may be used. When a mixture of a cyclic carbonate and a chain carbonate is used, a volume ratio of the cyclic carbonate to the chain carbonate is preferably about 1:9 to 5:5.

As the supporting electrolyte, for example, a Li salt such as $LiPF_6$, $LiBF_4$, $LiClO_4$, $LiAsF_6$, $Li(CF_3SO_2)_2N$, or $LiCF_3SO_3$ can be used. Among these supporting electrolytes, a combination of two or more kinds may be used. The concentration of the supporting electrolyte may be about 0.5 mol/L to 2.0 mol/L.

The electrolytic solution may contain an additive which adjusts the formation of a film on the active material particle surfaces. Examples of the additive include Li salts having an oxalato complex as an anion such as $LiB(C_2O_4)_2$, $LiBF_2(C_2O_4)$, and $LiPF_2(C_2O_4)_2$, $LiPO_2F_2$, vinylene carbonate (VC), vinyl ethylene carbonate (VEC), fluoroethylene carbonate (FEC), ethylene sulfite (ES), and propane sultone (PS).

The electrolytic solution may further contain an overcharge additive which promotes an increase in internal pressure during overcharge. Examples of the overcharge additive include cyclohexylbenzene (CHB), biphenyl (BP), biphenyl ether (BPE), tert-butylbenzene (TBB), and tert-amylbenzene (TAB).

Figure 9:
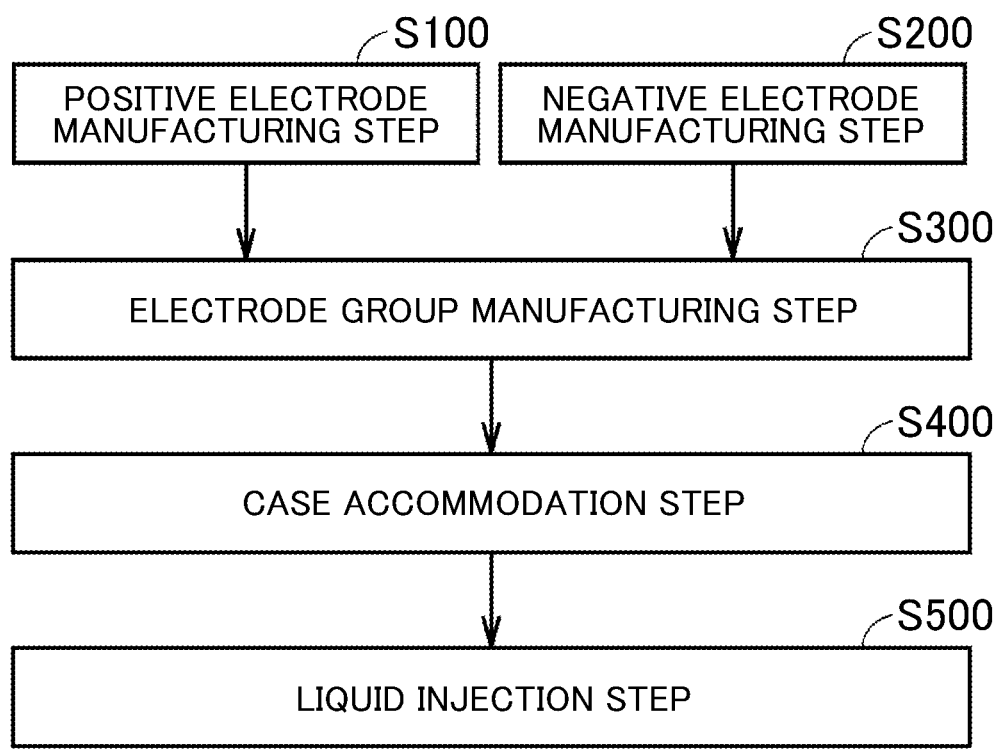
FIG. 9 is a flowchart showing the summary of a method of manufacturing the nonaqueous electrolyte secondary battery according to the embodiment of the invention.

FIG. 9 is a flowchart showing the summary of a method of manufacturing the nonaqueous electrolyte secondary battery according to the embodiment. As shown in FIG. 9, the manufacturing method includes, a positive electrode manufacturing step (S100), a negative electrode manufacturing step (S200), an electrode group manufacturing step (S300), a case accommodation step (S400), and a liquid injection step (S500). Among these steps, the positive electrode manufacturing step (S100) has been described above in "method of manufacturing the positive electrode", and thus the description thereof will not be repeated. Hereinafter, the steps other than the positive electrode manufacturing step will be described.

In the negative electrode manufacturing step, the negative electrode 20 shown in FIG. 8 is manufactured. The negative electrode can be manufactured using a well-known method of the related art. The negative electrode can be manufactured, for example, as follows. The negative electrode active material particles, the thickener, and the binder are kneaded with each other in water to form a paste. The paste is applied to the negative electrode current collector foil. The paste coating film is dried to form the negative electrode mixture layer. The negative electrode mixture layer is rolled to adjust the thickness. The whole body of the laminate is processed to obtain a predetermined dimension.

In the electrode group manufacturing step, the electrode group 80 shown in FIG. 7 is manufactured. For example, the positive electrode 10 and the negative electrode 20 are laminated with the separators 40 interposed therebetween to obtain a laminate, and the laminate is wound. As a result, an elliptical wound body is obtained. At this time, the exposure portions Ep of the positive electrode 10 and the negative electrode 20 are arranged in end portions in a direction moving along the winding axis Aw. The wound body is pressed such that the external shape thereof is processed into a flat shape. As a result, the electrode group 80 is obtained.

In the case accommodation step, the electrode group shown in FIG. 6 is accommodated in the case. The electrode group 80 is electrically connected to the positive electrode terminal 70 and the negative electrode terminal 72 through the exposure portions Ep.

In the liquid injection step, the electrolytic solution is injected into the case 50, and the electrode group 80 is impregnated with the electrolytic solution. For example, the electrolytic solution can be injected through a liquid injection hole (not shown) provided on the battery case 50. In the embodiment, in the hollow active material particles contained in the positive electrode mixture layer, the amount of the remaining solvent in the hollow portions is reduced. Further, the needle-shaped filler having a through-hole may function as a path through which the electrolytic solution is introduced into the hollow portions. Therefore, the electrolytic solution can be introduced into the hollow active material particles and can be held in the hollow portions. As a result, the non-uniformity of the electrolytic solution distribution can be reduced in the positive electrode mixture layer.

Hereinabove, the embodiment has been described using the square battery as an example. However, the embodiment is not limited to the square battery. The embodiment may be applied to, for example, a cylindrical battery or a laminate battery. The electrode group is not limited to the wound electrode group. The electrode group may be, for example, a laminated electrode group. That is, the electrode group may be manufactured by laminating a positive electrode and a negative electrode with a separator interposed therebetween.

Hereinafter, the embodiments will be described in more detail using Examples. However, the embodiments are not limited to the following Examples.

Hereinafter, Experiment 1 relating to the manufacturing of an electrode for a nonaqueous electrolyte secondary battery will be described. In Experiment 1, electrodes (positive electrodes) for a nonaqueous electrolyte secondary battery according to Manufacturing Examples Nos. 1 to 14 were manufactured, and the amounts of remaining solvents therein were measured. Here, Manufacturing Examples Nos. 1 to 5 and 10 to 14 correspond to Examples of the invention, and Manufacturing Examples Nos. 6 to 9 correspond to Comparative Examples.

Hereinafter, the manufacturing of Manufacturing Example No. 1 will be described. First, the following materials were prepared.

Positive electrode active material particles: hollow active material particle formed of $LiNi_{1/3}Co_{1/3}Mn_{1/3}O_2$ Conductive material: acetylene black (trade name: "DENKA BLACK", manufactured by Denka Co., Ltd.)

Binder: PVDF

Needle-shaped filler: hollow fiber formed of microfibrillated cellulose (non-conductive, diameter: 0.5 μm)

Solvent: NMP

Positive electrode current collector foil: aluminum foil (thickness: 20 μm)

Hereinafter, the first granulation step will be described. As a granulator, "HIGH SPEED GRAL (LHF-GS-2J)" manufactured by EARTHTECHNICA Co., Ltd. was prepared. The positive electrode active material particle (100 parts by mass), the conductive material (4 parts by mass), and the binder (2 parts by mass) were put into the granulator. The components were mixed for 2 minutes with a dry method by setting the rotating speed of an agitator blade to 200 rpm and setting the rotating speed of a chopper blade to 1000 rpm.

NMP was put into the granulator such that the solid content concentration of the mixture was 81 mass %. The components were stirred for 5 minutes by setting the rotating speed of an agitator blade to 200 rpm and setting the rotating speed of a chopper blade to 3000 rpm. As a result, a first granulated body was obtained as an aggregate of the granulated particles.

Hereinafter, the second granulation step will be described. The first granulated body, the conductive material (4 parts by mass), the needle-shaped filler (1 part by mass), and NMP were put into the granulator. The components were stirred for 5 minutes by setting the rotating speed of an agitator blade to 200 rpm and setting the rotating speed of a chopper blade to 3000 rpm. As a result, a second granulated body was obtained. In the second granulated body, the conductive material and the needle-shaped filler were attached to the surfaces of the granulated particles. The final solid content concentration of the second granulated body was 75 mass %.

Hereinafter, the sheet forming step and the arrangement step will be described. The electrode manufacturing apparatus shown in FIG. 4 was prepared. Using the electrode manufacturing apparatus 90, the positive electrode mixture layer 12 was formed by pressing the second granulated body 8 into a sheet shape. Next, the positive electrode mixture layer 12 was arranged on one main surface of the positive electrode current collector foil 11. After the arrangement, the positive electrode mixture layer 12 was dried using a hot air drying furnace. Likewise, the positive electrode mixture layer 12 was arranged on a main surface of the positive electrode current collector foil 11 opposite the above-described main surface. Next, the obtained laminate was processed to have a predetermined thickness and dimension. As a result, the positive electrode 10 of Manufacturing Example No. 1 shown in FIG. 1 was obtained.

The respective dimensions shown in FIG. 1 were as follows.

Length L10 of positive electrode: 4500 mm

Width W12 of positive electrode mixture layer: 94 mm

Thickness of positive electrode: 170 μm

Positive electrodes of Manufacturing Examples Nos. 2, 3, 10, and 11 were manufactured using the same method as in Manufacturing Example No. 1, except that the mixing amount of the needle-shaped filler was changed as shown in Table 1.

TABLE 1

| Manufacturing Example No. | Electrode Forming Method | Needle-shaped Filler having Through-hole | | | Amount of Remaining NMP ppm |
|---|---|---|---|---|---|
| | | Conductivity | Diameter μm | Mixing Amount part(s) by mass | |
| 1 | Two Steps of Granulation | Non-Conductive | 0.5 | 1.0 | 22 |
| 2 | Two Steps of Granulation | Non-Conductive | 0.5 | 0.5 | 12 |
| 3 | Two Steps of Granulation | Non-Conductive | 0.5 | 2.0 | 34 |
| 4 | Two Steps of Granulation | Non-Conductive | 0.1 | 1.0 | 37 |
| 5 | Two Steps of Granulation | Non-Conductive | 3.0 | 1.0 | 18 |
| 6 | Two Steps of Granulation | — | — | 0 | 1300 |
| 7 | Paste | Non-Conductive | 0.5 | 2.0 | 2180 |
| 8 | One Step of Granulation | Non-Conductive | 0.5 | 2.0 | 1130 |
| 9 | One Step of Granulation | Non-Conductive | 0.5 | 5.0 | 710 |
| 10 | Two Steps of Granulation | Non-Conductive | 0.5 | 0.1 | 432 |
| 11 | Two Steps of Granulation | Non-Conductive | 0.5 | 5.0 | 8 |
| 12 | Two Steps of Granulation | Non-Conductive | 0.05 | 1.0 | 720 |
| 13 | Two Steps of Granulation | Non-Conductive | 10 | 1.0 | 17 |
| 14 | Two Steps of Granulation | Conductive | 0.5 | 1.0 | 20 |

Positive electrodes of Manufacturing Examples Nos. 4, 5, 12, and 13 were manufactured using the same method as in Manufacturing Example No. 1, except that the diameter (fiber diameter) of the needle-shaped filler was changed as shown in Table 1.

A positive electrode of Manufacturing Example No. 6 was manufactured using the same method as in Manufacturing Example No. 1, except that the needle-shaped filler was not added as shown in Table 1.

A paste was formed while adjusting the mixing amount of each solid component to be the same as in Manufacturing Example No. 1. Using a die coater, the paste was applied to the positive electrode current collector foil to form the positive electrode mixture layer. A positive electrode of Manufacturing Example No. 7 was manufactured using the same method as in Manufacturing Example No. 1, except for the above-described configurations.

In the manufacturing of a positive electrode of Manufacturing Example No. 8, the total amount of the needle-shaped filler was added for granulation in the first granulation step. As a result, a granulated body was obtained in which the needle-shaped filler was uniformly dispersed. The mixing amount of the needle-shaped filler was 2 parts by mass with respect to 100 parts by mass of the positive electrode active material particles. A positive electrode of Manufacturing Example No. 8 was manufactured using the same method as in Manufacturing Example No. 1, except that a positive electrode mixture layer was formed of the granulated body. Manufacturing Example No. 8 was considered as a manufacturing example in which the granulated body was formed through one step of granulation.

A positive electrode of Manufacturing Example No. 9 was manufactured using the same method as in Manufacturing Example No. 8, except that the mixing amount of the needle-shaped filler was changed as shown in Table 1.

A positive electrode of Manufacturing Example No. 14 was manufactured using the same method as in Manufacturing Example No. 1, except that conductive carbon nanofiber was used as the needle-shaped filler.

In each of the positive electrodes of the manufacturing examples, the amount of the remaining solvent was measured. First, a sample having a predetermined size was cut from each of the positive electrodes. Using a solvent, NMP was extracted from the sample. As the extraction solvent, DEC was used. By using decane as a reference material, the amount of remaining NMP was measured using a gas chromatograph. The results are shown in Table 1.

Hereinafter, the results of Experiment 1 and the discussion thereof will be described. In regard to each of Manufacturing Examples Nos. 1 to 5 and 10 to 14, as shown in Table 1, a granulated body containing the needle-shaped filler was formed through two steps of granulation, and a positive electrode mixture layer was formed of the granulated body. In each of Manufacturing Examples Nos. 1 to 5 and 10 to 14 corresponding to Examples of the invention, the amount of remaining NMP was small. The reason for this is presumed to be that the volatilization of the solvent penetrating into the hollow active material particles was promoted by the capillary phenomenon of the needle-shaped filler having a through-hole. It is presumed that the arrangement of the needle-shaped filler on the surfaces of the granulated particles through two steps of granulation also contributed to the promotion of the volatilization of the solvent.

In the positive electrode mixture layers of the manufacturing examples, the hollow portions of the hollow active material particles had a space for holding the electrolytic solution. Therefore, in the positive electrode mixture layer, a reduction in the non-uniformity of the electrolytic solution was able to be expected.

In Manufacturing Example No. 7, the amount of the remaining solvent was large although the needle-shaped filler was added. The reason for this is presumed to be that, during the formation of the paste, the needle-shaped filler aggregated and thus was not able to be arranged on the surfaces of the hollow active material particles.

In Manufacturing Examples Nos. 8 and 9, the needle-shaped filler was mixed through one step of granulation. In Manufacturing Examples Nos. 8 and 9, the amount of the remaining solvent was larger than in the manufacturing examples corresponding to Examples of the invention in which two steps of granulation were performed. The reason for this is presumed to be that the effect of promoting the volatilization of the solvent was reduced by the needle-shaped filler being introduced into the granulated particles.

Hereinafter, the manufacturing of nonaqueous electrolyte secondary batteries according to Experiment 2 will be described. In Experiment 2, nonaqueous electrolyte secondary batteries were manufactured using the positive electrodes manufactured in the above-described manufacturing examples. Here, Positive Electrodes Nos. 1 to 5 and 8 to 14 correspond to Examples of the invention, and Positive Electrodes Nos. 6 and 7 correspond to Comparative Examples. Positive Electrodes Nos. 1 to 14 correspond to Manufacturing Examples Nos. 1 to 14, respectively.

In order to manufacture a negative electrode of Experiment 2, the following materials were prepared.

Negative electrode active material particles: graphite

Thickener: CMC (trade name "BSH-6", manufactured by DKS Co., Ltd.)

Binder: SBR mixture

Composition: (negative electrode active material:thickener:binder=100:1:0.8 (mass ratio))

Negative electrode current collector foil: Cu foil (thickness: 14 μm)

The negative electrode active material particles, the thickener, and the binder were kneaded with each other in water to form a paste. Using a die coater, this paste was applied to a predetermined position on the negative electrode current collector foil and was dried to form a negative electrode mixture layer. The negative electrode mixture layer was rolled to adjust the thickness. The whole body of the laminate was processed to obtain a predetermined dimension. As a result, the negative electrode 20 shown in FIG. 8 was manufactured.

The respective dimensions shown in FIG. 8 were as follows.

Length L20 of negative electrode: 4700 mm

Width W22 of negative electrode mixture layer: 100 mm

Thickness of negative electrode: 150 μm

A separator substrate was prepared by laminating three layers including a porous layer of PP, a porous layer of PE, and a porous layer of PP in this order. The thickness of the separator substrate was 25 μm.

A paste for forming a heat resistance layer was prepared by kneading alumina particles and acrylic rubber with each other in a solvent. As a kneading machine, "CLEARMIX" manufactured by M Technique Co., Ltd. was used. Using a gravure coater, the paste was applied to a surface of the separator substrate and was dried to form a heat resistance layer.

As shown in FIG. 7, a wound body was obtained by laminating the positive electrode 10 and the negative elec trode 20 with the separators 40 interposed therebetween to obtain a laminate and winding the laminate. Using a flat pressing machine, the wound body was pressed into a flat shape for two minutes at a pressure of 4 kN/cm² to manufacture the electrode group 80.

As shown in FIG. 6, the positive electrode terminal 70 and the negative electrode terminal 72 were connected to the electrode group 80, and then the electrode group 80 was accommodated in the case 50.

An electrolytic solution having the following composition was prepared. The amounts of additives with respect to 100 parts by mass of the electrolytic solution are as follows.

Supporting electrolyte: $LiPF_6$ (1.0 mol/L)
Nonaqueous solvent: (EC:DMC:EMC=3:4:3 (volume ratio))
Additives: CHB (1 part by mass) and BP (1 part by mass)
Injection amount: 125 g The electrolytic solution was injected through the liquid injection hole of the case 50, and the liquid injection hole was sealed to seal the inside of the case 50. As a result, nonaqueous electrolyte secondary batteries having a rated capacity of 24 Ah were manufactured.

The performance of each of the batteries was evaluated as follows. In the following description, the unit "C" for the current value refers to the current value at which the rated capacity of a battery is completely discharged in 1 hour. "CC-CV" refers to constant current-constant voltage, and "SOC" refers to charging rate.

The SOC of the battery was adjusted to 60% at 25° C. Pulse discharging was performed under conditions of 10 C×10 seconds to measure a voltage drop amount. The IV resistance was calculated based on the current value and the voltage drop amount. The results are shown in Tables 2 and 3. In Table 3, each value of the IV resistance is an average value of 10 batteries.

TABLE 3

| Positive Electrode No. | IV Resistance mΩ | Capacity Retention after Cycles % | Capacity Retention after High-Temperature Storage % |
|---|---|---|---|
| 1 | 3.3 | 87.6 | 95 |
| 2 | 3.3 | 88.0 | 94 |
| 3 | 3.4 | 87.5 | 96 |
| 4 | 3.4 | 88.0 | 95 |
| 5 | 3.5 | 87.4 | 97 |
| 6 | 4.3 | 79.1 | 94 |
| 7 | 5.8 | 74.3 | 79 |
| 8 | 4.2 | 79.8 | 85 |
| 9 | 4.4 | 80.5 | 82 |
| 10 | 3.9 | 82.1 | 93 |
| 11 | 4.5 | 80.1 | 92 |
| 12 | 4.3 | 81.3 | 93 |
| 13 | 4.2 | 81.2 | 94 |
| 14 | 3.0 | 86.3 | 79 |

The battery was charged to 4.1 V at a current value of 1 C, and the operation was stopped for 5 minutes. Next, the battery was charged to 3.0 V at a current value of 1 C, and the operation was stopped for 5 minutes. Next, CC-CV charging and CC-CV discharging were performed under the following conditions to measure the initial capacity.

CC-CV Charging

CC current value: 1 C

CV voltage: 4.1 V

End current: 0.1 C

TABLE 2

| | Electrode Mixture Layer | | | | |
|---|---|---|---|---|---|
| | | | Needle-shaped Filler having Through-hole | | |
| Positive Electrode No. | Electrode Forming Method | Conductivity | Mixing Amount part(s) by mass | Diameter μm | Amount of Remaining NMP ppm |
| 1 | Two Steps of Granulation | Non-Conductive | 1.0 | 0.5 | 22 |
| 2 | Two Steps of Granulation | Non-Conductive | 0.5 | 0.5 | 12 |
| 3 | Two Steps of Granulation | Non-Conductive | 2.0 | 0.5 | 34 |
| 4 | Two Steps of Granulation | Non-Conductive | 1.0 | 0.1 | 37 |
| 5 | Two Steps of Granulation | Non-Conductive | 1.0 | 3.0 | 18 |
| 6 | Two Steps of Granulation | — | 0 | — | 1300 |
| 7 | Paste | Non-Conductive | 2.0 | 0.5 | 2180 |
| 8 | One Step of Granulation | Non-Conductive | 2.0 | 0.5 | 1130 |
| 9 | One Step of Granulation | Non-Conductive | 5.0 | 0.5 | 710 |
| 10 | Two Steps of Granulation | Non-Conductive | 0.1 | 0.5 | 432 |
| 11 | Two Steps of Granulation | Non-Conductive | 5.0 | 0.5 | 8 |
| 12 | Two Steps of Granulation | Non-Conductive | 1.0 | 0.05 | 720 |
| 13 | Two Steps of Granulation | Non-Conductive | 1.0 | 10 | 17 |
| 14 | Two Steps of Granulation | Conductive | 1.0 | 0.5 | 20 |

CC-CV Discharging
  CC current value: 1 C
  CV voltage: 3.0 V
  End current: 0.1 C After the measurement of the initial capacity, in a thermostatic chamber set to 50° C., 1000 charging-discharging cycles were performed in which the following charging and discharging operations were set as one cycle.

Charging
  Current value: 2 C
  End voltage: 4.1 V
Discharging
  Current value: 2 C
  End voltage: 3.0 V After 1000 cycles, the capacity after cycles was measured using the same method as in the measurement of the initial capacity. The capacity retention after cycles was calculated by dividing the capacity after cycles by the initial capacity. The results are shown in Table 3. In Table 3, each value of the capacity retention after cycles is an average value of 5 batteries.

A high-temperature storage test was performed as follows. The SOC of the battery was adjusted to 100% at 25° C. The battery was put into a thermostatic chamber set to 60° C. and was stored for 100 days. After 100 days, the battery was extracted, and the capacity after high-temperature storage was measured using the same method as in the measurement of the initial capacity. The capacity retention after high-temperature storage was calculated by dividing the capacity after high-temperature storage by the initial capacity. The results are shown in Table 3. In Table 3, each value of the capacity retention after high-temperature storage is an average value of 50 batteries.

Hereinafter, the results of Experiment 2 and the discussion thereof will be described. In Positive Electrodes Nos. 1 to 5 and 8 to 14, the needle-shaped filler having a through-hole was arranged on the surfaces of the hollow active material particles. According to Table 1, in Positive Electrodes Nos. 1 to 5 and 8 to 14, the capacity retention after cycles was high. The reason for this is presumed to be that the hollow active material particles were able to hold a large amount of the electrolytic solution because the amount of NMP in the hollow active material particles is reduced, and thus the non-uniformity of the electrolytic solution distribution in the positive electrode mixture layer was improved On the other hand, in Positive Electrodes Nos. 6 and 7, the capacity retention after cycles was low. The reason for this is presumed to be that the amount of remaining NMP was large, and the electrolytic solution distribution in the positive electrode mixture layer was non-uniform. That is, the reason for this is presumed to be that, since there was a difference in the reactivity of the active material between a portion where NMP remains and the amount of the remaining electrolytic solution was small and a portion where NMP was volatilized and replaced with the electrolytic solution, local deterioration was promoted, and the capacity retention decreased. In addition, since the amount of remaining NMP was large, high-temperature preservation characteristics decreased.

In Positive Electrodes Nos. 8 and 9 in which the granulated body was formed through two steps of granulation, the capacity retention after cycles was higher than that of the positive electrodes in which the granulated body was formed through one step of granulation. The following can be said from the above results: it is preferable that the needle-shaped filler is arranged on the surfaces of the hollow active material particles and is arranged on the surfaces of the granulated particles.

When the mixing amount of the needle-shaped filler was 0.1 parts by mass to 5.0 parts by mass with respect to 100 parts by mass of the hollow active material particles, improvement of cycle characteristics, that is, the effect of reducing the non-uniformity of the electrolytic solution was able to be verified from this experiment. It was able to be verified that, when the mixing amount was 0.5 parts by mass to 2.0 parts by mass, the effect was high.

When the diameter of the needle-shaped filler was 0.05 µm to 10 µm, improvement of cycle characteristics was able to be verified from this experiment. It was able to be verified that, when the diameter was 0.1 µm to 3.0 µm, the effect was high.

In Positive Electrode No. 14 in which conductive carbon nanofiber was used as the needle-shaped filler, the capacity retention after high-temperature storage was low. Since a conductive filler is highly reactive with an electrolytic solution, it is presumed that the reaction between the conductive filler and the electrolytic solution is progressed in a high-temperature environment. Therefore, the following can be said: it is preferable that the needle-shaped filler is non-conductive.

Hereinabove, the embodiment and the examples of the invention have been described. The configurations of the embodiment and the examples may be appropriately combined. The embodiment and the examples of the invention may be appropriately changed within a range where the effects of the invention do not significantly deteriorate.

What is claimed is:

1. An electrode for a nonaqueous electrolyte secondary battery, the electrode comprising:
   an electrode mixture layer containing a hollow active material particle and a needle-shaped filler particle, wherein
   the needle-shaped filler particle consists of cellulose or polyacrylonitrile in the shape of a hollow cylindrical shell having an outer diameter of 0.1 to 10 µm, an outer cylindrical surface extending along an entire length of the needle-shaped particle, and an inner cylindrical surface extending along the entire length of the needle-shaped particle, the inner cylindrical surface defining a single through-hole of the needle-shaped particle,
   the needle-shaped filler particle is arranged on an outer surface of the hollow active material particle such that the outer cylindrical surface of the needle-shaped particle contacts the outer surface of the hollow active material particle,
   the hollow active material particle is a secondary particle that includes an outer shell defined by an aggregate of primary particles, a hollow interior portion enclosed and surrounded by the outer shell, and at least one through-hole in the outer shell such that the hollow interior portion is in fluid communication with an exterior of the hollow active particle, and
   an average particle size of the hollow active material particle is 3 to 25 µm.

2. The electrode for a nonaqueous electrolyte secondary battery according to claim 1, wherein
   a content of the needle-shaped filler particle is 0.1 parts by mass to 5.0 parts by mass with respect to 100 parts by mass of the hollow active material particle.

3. The electrode for a nonaqueous electrolyte secondary battery according to claim 1, wherein
   the outer diameter of the needle-shaped filler particle is 0.5 µm to 3.0 µm.

4. A method of manufacturing an electrode for a nonaqueous electrolyte secondary battery, comprising:

obtaining a first granulated body by granulating hollow active material particles, a conductive material and a binder;

obtaining a second granulated body by granulating the first granulated body and needle-shaped filler particles;

forming an electrode mixture layer by forming the second granulated body into a sheet shape; and arranging the electrode mixture layer on a current collector foil, wherein the needle-shaped filler particles are in the shape of a hollow cylindrical shell having an outer cylindrical surface extending along an entire length of the needle-shaped particle, and an inner cylindrical surface extending along the entire length of the needle-shaped particle, the inner cylindrical surface defining a single through-hole of the needle-shaped particle, in the electrode mixture layer, a plurality of the hollow active material particles have at least one of the needle-shaped filler particle arranged on an outer surface thereof such that the outer cylindrical surface of the needle-shaped particle contacts the outer surface of the hollow active material particle, the hollow active material particle is a secondary particle that includes an outer shell defined by an aggregate of primary particles, a hollow interior portion enclosed and surrounded by the outer shell, and at least one through-hole in the outer shell such that the hollow interior portion is in fluid communication with an exterior of the hollow active particle, and the needle-shaped filler particles consist of cellulose or polyacrylonitrile.

5. The electrode for a nonaqueous electrolyte secondary battery according to claim 1, wherein
the through-hole of the needle-shaped filler particle is in fluid communication with the hollow interior portion of the hollow active material.

6. The electrode for a nonaqueous electrolyte secondary battery according to claim 1, wherein
two or more needle-shaped filler particles are arranged on the surface of the hollow active material particle.

7. The electrode for a nonaqueous electrolyte secondary battery according to claim 1, wherein
an average particle size of the primary particles is 0.1 to 2 μm.

8. The electrode for a nonaqueous electrolyte secondary battery according to claim 1, wherein
the length of the needle-shaped filler particle is 2 to 20 μm.

9. The electrode for a nonaqueous electrolyte secondary battery according to claim 7, wherein
the length of the needle-shaped filler particle is 2 to 20 μm.

10. The method according to claim 4, wherein
the needle-shaped filler particles have an outer diameter of 0.1 to 10 μm.

11. The method according to claim 4, wherein
an average particle size of the hollow active material particle is 3 to 25 μm.

12. The method according to claim 4, wherein
an average particle size of the primary particles is 0.1 to 2 μm, and
an average particle size of the secondary particle is 3 to 25 μm.

13. The method according to claim 4, wherein
the length of the needle-shaped filler particle is 2 to 20 μm.

14. The method according to claim 12, wherein
the length of the needle-shaped filler particle is 2 to 20 μm.

15. The method according to claim 4, wherein
in the step of obtaining the second granulated body, a content of the needle-shaped filler particles is 0.1 parts by mass to 5.0 parts by mass with respect to 100 parts by mass of the hollow active material particles.

16. An electrode for a nonaqueous electrolyte secondary battery, the electrode comprising:
an electrode mixture layer containing a hollow active material particle and a needle-shaped filler particle, wherein
the needle-shaped filler particle consists of cellulose or polyacrylonitrile in the shape of a hollow cylindrical shell having an outer diameter of 0.1 to 10 μm, an outer cylindrical surface extending along an entire length of the needle-shaped particle, and an inner cylindrical surface extending along the entire length of the needle-shaped particle, the inner cylindrical surface defining a single through-hole of the needle-shaped particle,
the needle-shaped filler particle is arranged on an outer surface of the hollow active material particle such that the outer cylindrical surface of the needle-shaped particle contacts the outer surface of the hollow active material particle,
an average particle size of the hollow active material particle is 3 to 25 μm,
the length of the needle-shaped filler particle is 2 to 20 μm.

* * * * *